US012596339B2

(12) United States Patent
Oshima et al.

(10) Patent No.: US 12,596,339 B2
(45) Date of Patent: Apr. 7, 2026

(54) PRODUCTION MANAGEMENT DEVICE, PRODUCTION MANAGEMENT SYSTEM, PRODUCTION MANAGEMENT METHOD, AND STORAGE MEDIUM

(71) Applicant: Kabushiki Kaisha Toshiba, Tokyo (JP)

(72) Inventors: Hirotomo Oshima, Yokohama Kanagawa (JP); Yuta Shirakawa, Kawasaki Kanagawa (JP); Takanori Yoshii, Kawasaki Kanagawa (JP); Masamitsu Fukuda, Yokohama Kanagawa (JP); Takehiro Kato, Yokohama Kanagawa (JP); Keisuke Nishimura, Fujisawa Kanagawa (JP); Yasuo Namioka, Nerima Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 406 days.

(21) Appl. No.: 18/169,447

(22) Filed: Feb. 15, 2023

(65) Prior Publication Data

US 2023/0324858 A1     Oct. 12, 2023

(30) Foreign Application Priority Data

Mar. 23, 2022     (JP) ................................. 2022-046916

(51) Int. Cl.
*G05B 13/04* (2006.01)
*G05B 13/02* (2006.01)

(52) U.S. Cl.
CPC ......... *G05B 13/048* (2013.01); *G05B 13/027* (2013.01)

(58) Field of Classification Search
None
See application file for complete search history.

(56) References Cited

U.S. PATENT DOCUMENTS 5,231,567 A     7/1993 Matoba et al.
5,479,343 A     12/1995 Matoba et al.
(Continued)

FOREIGN PATENT DOCUMENTS

CN     106022552 A     10/2016
CN     107578158 A     1/2018
(Continued)

OTHER PUBLICATIONS

RAFT Optical Flow EgoHands, Sep. 16, 2020, https://www.youtube.com/wat ch?v=Xr4VBzUGzyk.
(Continued)

*Primary Examiner* — David Earl Ogg
(74) *Attorney, Agent, or Firm* — Knobbe, Martens, Olson & Bear, LLP

(57)     ABSTRACT

According to one embodiment, a production management device acquires a first short-term plan generated based on a first long-term plan. The first long-term plan is of a plan of production in a prescribed period. The first short-term plan is of a plan of production in a first period. The device acquires first progress data of a progress in a task, and acquires first prediction data by using the first progress data. The first prediction data is of a prediction of a progress in the task. The device revises the first short-term plan based on the first prediction data, and acquires second prediction data by using second progress data. The second progress data is of a progress in the task. The second prediction data is of a prediction of a progress of the production in the prescribed period. The device generates a second long-term plan in the prescribed period.

15 Claims, 16 Drawing Sheets

(56) References Cited

U.S. PATENT DOCUMENTS

| | | | |
|---|---|---|---|
| 6,434,440 B1 * | 8/2002 | Teranishi | G06Q 10/06 |
| | | | 700/121 |
| 6,438,436 B1 * | 8/2002 | Hohkibara | G06Q 10/06 |
| | | | 700/99 |
| 7,092,775 B2 | 8/2006 | Nomoto et al. | |
| 2006/0212323 A1 * | 9/2006 | Ninomiya | G06Q 10/087 |
| | | | 705/7.29 |
| 2008/0103715 A1 | 5/2008 | Tsuda et al. | |
| 2013/0166055 A1 | 6/2013 | Ishibashi et al. | |
| 2016/0282844 A1 | 9/2016 | Nomoto et al. | |
| 2019/0340843 A1 * | 11/2019 | McCarson | G06F 18/24 |
| 2020/0019910 A1 * | 1/2020 | Norman | G06Q 10/06375 |

FOREIGN PATENT DOCUMENTS

| | | |
|---|---|---|
| CN | 112130526 A | 12/2020 |
| CN | 112262350 A | 1/2021 |
| JP | H06-231135 | 8/1994 |
| JP | 2003-052039 | 2/2003 |
| JP | 2006-139751 A | 6/2006 |
| JP | 2007-041775 A | 2/2007 |
| JP | 2007108880 A * | 4/2007 |
| JP | 2007-164446 A | 6/2007 |
| JP | 2007142459 A * | 6/2007 |
| JP | 2008-112209 | 5/2008 |
| JP | 2011-065613 | 3/2011 |
| JP | 2018-190003 A | 11/2018 |
| JP | 2021-157362 A | 10/2021 |

OTHER PUBLICATIONS

Office Action issued in Indian Patent Application No. 202314009511, dated Jul. 1, 2025 in 8 pages.

Office Action issued in Chinese Patent Application No. 2023-10134574.7, dated Sep. 27, 2025 in 7 pages.

* cited by examiner

100A

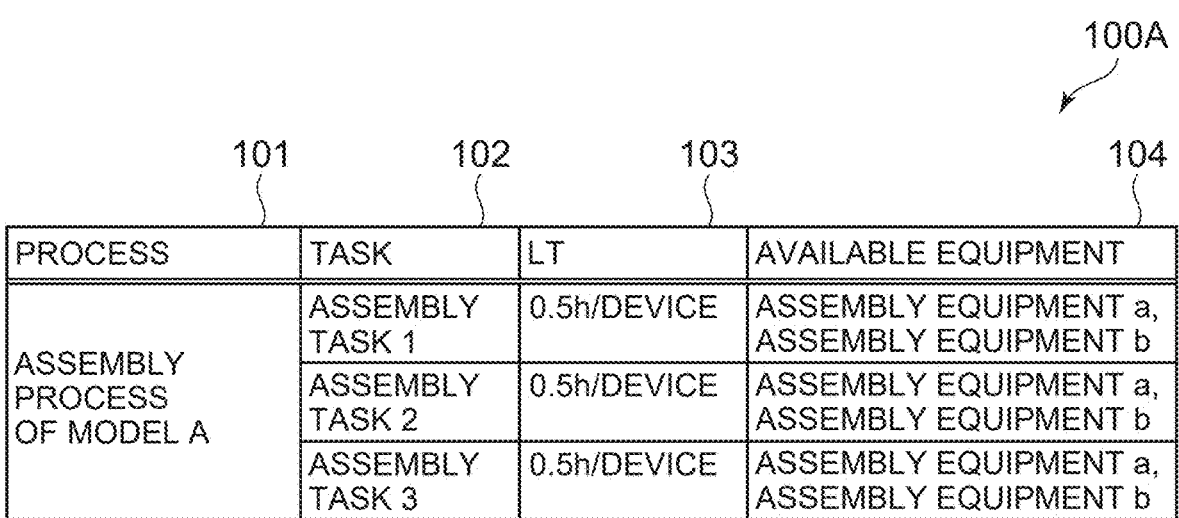

| PROCESS | TASK | LT | AVAILABLE EQUIPMENT |
|---|---|---|---|
| ASSEMBLY PROCESS OF MODEL A | ASSEMBLY TASK 1 | 0.5h/DEVICE | ASSEMBLY EQUIPMENT a, ASSEMBLY EQUIPMENT b |
| | ASSEMBLY TASK 2 | 0.5h/DEVICE | ASSEMBLY EQUIPMENT a, ASSEMBLY EQUIPMENT b |
| | ASSEMBLY TASK 3 | 0.5h/DEVICE | ASSEMBLY EQUIPMENT a, ASSEMBLY EQUIPMENT b |

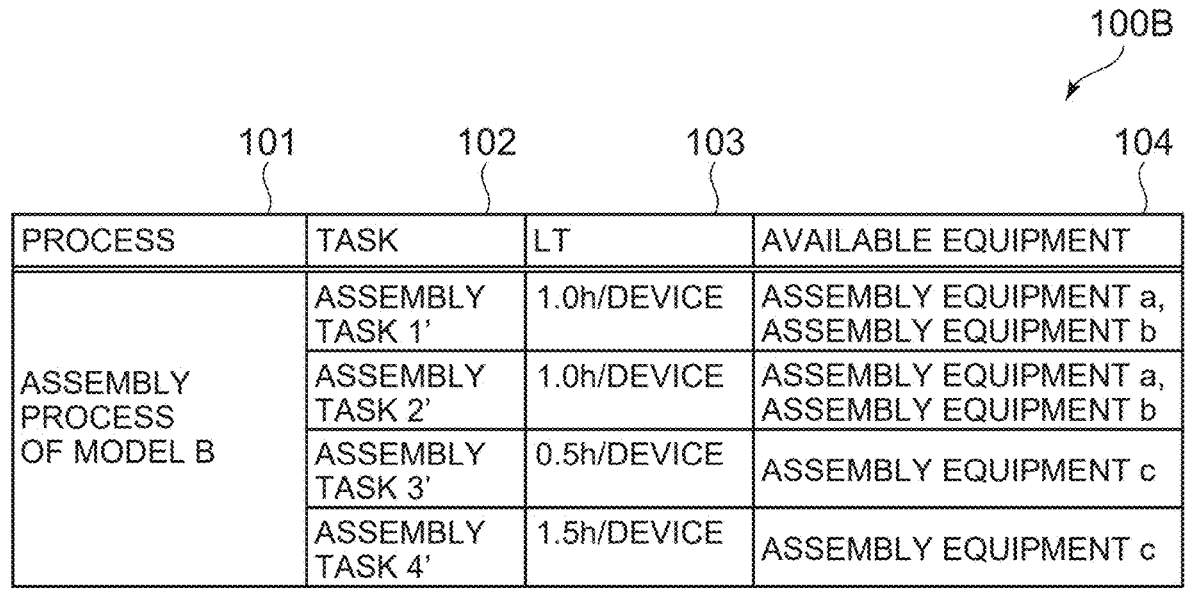

| PROCESS | TASK | LT | AVAILABLE EQUIPMENT |
|---|---|---|---|
| ASSEMBLY PROCESS OF MODEL B | ASSEMBLY TASK 1' | 1.0h/DEVICE | ASSEMBLY EQUIPMENT a, ASSEMBLY EQUIPMENT b |
| | ASSEMBLY TASK 2' | 1.0h/DEVICE | ASSEMBLY EQUIPMENT a, ASSEMBLY EQUIPMENT b |
| | ASSEMBLY TASK 3' | 0.5h/DEVICE | ASSEMBLY EQUIPMENT c |
| | ASSEMBLY TASK 4' | 1.5h/DEVICE | ASSEMBLY EQUIPMENT c |

| | 111 | 112 | 113 | 114 | 115 |
|---|---|---|---|---|---|
| | | TASK | SKILL LEVEL | LT | YIELD |
| WORKER X | ASSEMBLY TASK 1 | STANDARD | 0.5h/DEVICE | 95% |
| | ASSEMBLY TASK 2 | STANDARD | 0.5h/DEVICE | 95% |
| | ASSEMBLY TASK 3 | STANDARD | 0.5h/DEVICE | 95% |

| | 111 | 112 | 113 | 114 | 115 |
|---|---|---|---|---|---|
| | | TASK | SKILL LEVEL | LT | YIELD |
| WORKER Y | ASSEMBLY TASK 1 | EXPERT | 0.3h/DEVICE | 98% |
| | ASSEMBLY TASK 2 | EXPERT | 0.4h/DEVICE | 97% |
| | ASSEMBLY TASK 3 | EXPERT | 0.3h/DEVICE | 98% |

| | 111 | 112 | 113 | 114 | 115 |
|---|---|---|---|---|---|
| | | TASK | SKILL LEVEL | LT | YIELD |
| WORKER Z | ASSEMBLY TASK 1 | BEGINNER | 0.6h/DEVICE | 94% |
| | ASSEMBLY TASK 2 | BEGINNER | 0.7h/DEVICE | 95% |
| | ASSEMBLY TASK 3 | BEGINNER | 0.7h/DEVICE | 95% |

| 121 | 122 |
|---|---|
| EQUIPMENT | DOWNTIME RATIO |
| ASSEMBLY EQUIPMENT a | 2% |
| ASSEMBLY EQUIPMENT b | 2% |
| ASSEMBLY EQUIPMENT c | 1% |

| MODEL | PRODUCTION QUANTITY | MEMBER ACCEPTANCE DATE | SCHEDULED ASSEMBLY START DATE | SCHEDULED ASSEMBLY COMPLETION DATE | SCHEDULED SHIPMENT DATE |
|---|---|---|---|---|---|
| A | 12 DEVICES | FEB 1 | FEB 2 | FEB 4 | FEB 5 |

| MODEL | INPUT QUANTITY | TRANSFER DATE AND TIME | INPUT DATE AND TIME | ASSEMBLY WORKER | TRANSPORT WORKER | EQUIPMENT USED |
|---|---|---|---|---|---|---|
| A | 2 DEVICES | FEB 2 8:30 | FEB 2 9:00 | WORKER X | WORKER Z | ASSEMBLY EQUIPMENT a |
| A | 2 DEVICES | FEB 2 12:30 | FEB 2 13:00 | WORKER X | WORKER Z | ASSEMBLY EQUIPMENT a |
| A | 2 DEVICES | FEB 3 8:30 | FEB 3 9:00 | WORKER Y | WORKER Z | ASSEMBLY EQUIPMENT b |

FIG. 4B

| MODEL | INPUT QUANTITY | TRANSFER DATE AND TIME | INPUT DATE AND TIME | ASSEMBLY WORKER | TRANSPORT WORKER | EQUIPMENT USED |
|---|---|---|---|---|---|---|
| A | 2 DEVICES | FEB 2 8:30 | FEB 2 9:00 | WORKER X | WORKER Z | ASSEMBLY EQUIPMENT a |
| A | 2 DEVICES | FEB 2 12:30 | FEB 2 13:00 | WORKER X | WORKER Z | ASSEMBLY EQUIPMENT a |
| A | 2 DEVICES | FEB 2 15:00 | FEB 2 15:30 | WORKER X | WORKER Z | ASSEMBLY EQUIPMENT a |
| A | 2 DEVICES | FEB 2 8:45 | FEB 2 9:15 | WORKER Y | WORKER Z | ASSEMBLY EQUIPMENT b |
| A | 2 DEVICES | FEB 2 12:45 | FEB 2 13:15 | WORKER Y | WORKER Z | ASSEMBLY EQUIPMENT a |
| A | 2 DEVICES | FEB 2 15:15 | FEB 2 15:45 | WORKER Y | WORKER Z | ASSEMBLY EQUIPMENT a |

FIG. 8A

| MODEL | INPUT QUANTITY | TRANSFER DATE AND TIME | INPUT DATE AND TIME | ASSEMBLY WORKER | TRANSPORT WORKER | EQUIPMENT USED |
|---|---|---|---|---|---|---|
| A | 2 DEVICES | FEB 2 8:30 | FEB 2 9:00 | WORKER X | WORKER Z | ASSEMBLY EQUIPMENT a |
| A | 2 DEVICES→3 DEVICES | FEB 2 12:30 | FEB 2 13:00 | WORKER X | WORKER Z | ASSEMBLY EQUIPMENT a |
| A | 2 DEVICES→4 DEVICES | FEB 2 15:00 | FEB 2 15:30 | WORKER X | WORKER Z | ASSEMBLY EQUIPMENT a |
| A | 2 DEVICES | FEB 2 8:45 | FEB 2 9:15 | WORKER Y | WORKER Z | ASSEMBLY EQUIPMENT b |
| A | 2 DEVICES | FEB 2 12:45 | FEB 2 13:15 | WORKER Y | WORKER Z | ASSEMBLY EQUIPMENT a |
| A | 2 DEVICES | FEB 2 15:15 | FEB 2 15:45 | WORKER Y | WORKER Z | ASSEMBLY EQUIPMENT a |

FIG. 8B

| MODEL | INPUT QUANTITY | TRANSFER DATE AND TIME | INPUT DATE AND TIME | ASSEMBLY WORKER | TRANSPORT WORKER | EQUIPMENT USED |
|---|---|---|---|---|---|---|
| A | 2 DEVICES | FEB 2 8:30 | FEB 2 9:00 | WORKER X | WORKER Z | ASSEMBLY EQUIPMENT a |
| A | 3 DEVICES | FEB 2 12:30 | FEB 2 13:00 | WORKER X | WORKER Z | ASSEMBLY EQUIPMENT a |
| A | 4 DEVICES | FEB 2 15:00 | FEB 2 15:30 | WORKER X | WORKER Z | ASSEMBLY EQUIPMENT a |
| A | 2 DEVICES | FEB 2 8:45 | FEB 2 9:15 | WORKER Y | WORKER Z | ASSEMBLY EQUIPMENT b |
| A | 2 DEVICES | FEB 2 12:45 | FEB 2 13:15 | WORKER Y | WORKER Z | ASSEMBLY EQUIPMENT a |
| A | 2 DEVICES | FEB 2 15:15 | FEB 2 15:45 | WORKER Y | WORKER Z | ASSEMBLY EQUIPMENT a |

FIG. 10A

| MODEL | INPUT QUANTITY | TRANSFER DATE AND TIME | INPUT DATE AND TIME | ASSEMBLY WORKER | TRANSPORT WORKER | EQUIPMENT USED |
|---|---|---|---|---|---|---|
| A | 2 DEVICES | FEB 2 8:30 | FEB 2 9:00 | WORKER X | WORKER Z | ASSEMBLY EQUIPMENT a |
| A | 3 DEVICES | FEB 2 12:30 | FEB 2 13:00 | WORKER X | WORKER Z | ASSEMBLY EQUIPMENT a |
| A | 4 DEVICES→3 DEVICES | FEB 2 15:00 | FEB 2 15:30 | WORKER X | WORKER Z | ASSEMBLY EQUIPMENT a |
| A | 2 DEVICES | FEB 2 8:45 | FEB 2 9:15 | WORKER Y | WORKER Z | ASSEMBLY EQUIPMENT b |
| A | 2 DEVICES | FEB 2 12:45 | FEB 2 13:15 | WORKER Y | WORKER Z | ASSEMBLY EQUIPMENT a |
| A | 2 DEVICES | FEB 2 15:15 | FEB 2 15:45 | WORKER Y | WORKER Z | ASSEMBLY EQUIPMENT a |

FIG. 10B

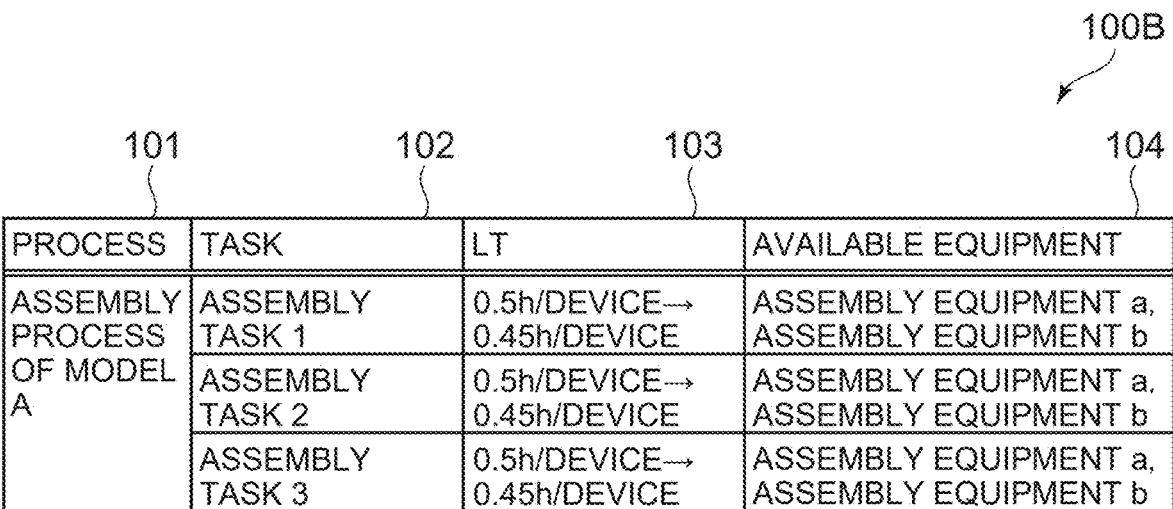

110A

| | TASK | SKILL LEVEL | LT | YIELD |
|---|---|---|---|---|
| WORKER X | ASSEMBLY TASK 1 | STANDARD | 0.5h/DEVICE→ 0.4h/DEVICE | 95% |
| | ASSEMBLY TASK 2 | STANDARD | 0.5h/DEVICE→ 0.4h/DEVICE | 95% |
| | ASSEMBLY TASK 3 | STANDARD | 0.5h/DEVICE→ 0.4h/DEVICE | 95% |

| PROCESS | TASK | LT | AVAILABLE EQUIPMENT |
|---|---|---|---|
| ASSEMBLY PROCESS OF MODEL A | ASSEMBLY TASK 1 | 0.5h/DEVICE→ 0.45h/DEVICE | ASSEMBLY EQUIPMENT a, ASSEMBLY EQUIPMENT b |
| | ASSEMBLY TASK 2 | 0.5h/DEVICE→ 0.45h/DEVICE | ASSEMBLY EQUIPMENT a, ASSEMBLY EQUIPMENT b |
| | ASSEMBLY TASK 3 | 0.5h/DEVICE→ 0.45h/DEVICE | ASSEMBLY EQUIPMENT a, ASSEMBLY EQUIPMENT b |

PRODUCTION MANAGEMENT DEVICE, PRODUCTION MANAGEMENT SYSTEM, PRODUCTION MANAGEMENT METHOD, AND STORAGE MEDIUM

CROSS-REFERENCE TO RELATED APPLICATIONS

This application is based upon and claims the benefit of priority from Japanese Patent Application No. 2022-046916, filed on Mar. 23, 2022; the entire contents of which are incorporated herein by reference.

FIELD

Embodiments described herein relate generally to a production management device, a production management system, a production management method, and a storage medium.

BACKGROUND

Conventionally, a production plan is generated using a production scheduler. Technology that can generate a plan with less deviation from the actual production is desirable.

BRIEF DESCRIPTION OF THE DRAWINGS

FIGS. 2A and 2B are tables illustrating production master data;

FIGS. 3A to 3D are tables illustrating manufacturing master data;

FIG. 4A is an example of a long-term plan, FIG. 4B is an example of a short-term plan;

FIG. 8A is a table showing a pre-generated short-term plan, FIG. 8B is a table showing a revised short-term plan;

FIG. 10A a table showing the revised short-term plan, FIG. 10B is a table showing the short-term plan after being revised again;

FIG. 12A is a table illustrating the updated manufacturing master data, FIG. 12B is a table illustrating the updated production master data;

DETAILED DESCRIPTION

Figure 1:
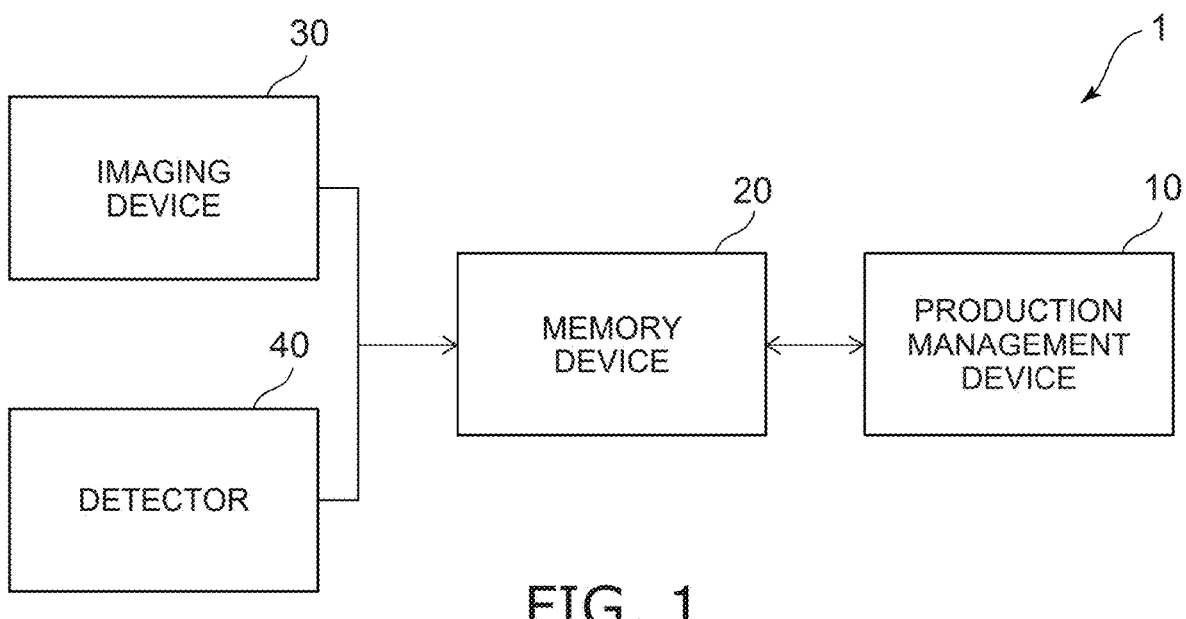
FIG. 1 is a schematic view showing a configuration of the production management system according to the embodiment.

According to one embodiment, a production management device acquires a first short-term plan generated based on a first long-term plan. The first long-term plan is of a plan of production in a prescribed period. The first short-term plan is of a plan of production in a first period. The first period is shorter than the prescribed period. The production management device acquires first progress data of a progress in a task performed according to a part of the first short-term plan. The production management device acquires first prediction data by using the first progress data. The first prediction data is of a prediction of a progress in the task performed according to an other part of the first short-term plan. The production management device revises the first short-term plan based on the first prediction data. The production management device acquires second prediction data by using second progress data. The second progress data is of a progress in the task in the first period. The second prediction data is of a prediction of a progress of the production in the prescribed period. The production management device generates a second long-term plan in the prescribed period by using the second prediction data.

Various embodiments are described below with reference to the accompanying drawings. In the specification and drawings, components similar to those described previously or illustrated in an antecedent drawing are marked with like reference numerals, and a detailed description is omitted as appropriate.

A production management system according to an embodiment is used to manage or support the production of a product. The production management system revises or generates a production plan based on data obtained when performing a task related to the production. The production plan includes short-term plans and long-term plans.

FIG. 1 is a schematic view showing a configuration of the production management system according to the embodiment.

As shown in FIG. 1, the production management system 1 according to the embodiment includes a production management device 10, a memory device 20, an imaging device 30, and a detector 40.

The imaging device 30 is installed in a production site and images a worker or an article handled in a task. For example, the imaging device 30 repeatedly acquires still images and stores image data of the still images in the memory device 20. The imaging device 30 may acquire a video image. In such a case, still images are repeatedly cut out from the video image.

The detector 40 detects a signal generated by an operation of the worker. For example, the detector 40 includes at least one selected from a torque sensor, an acceleration sensor, and an angular velocity sensor and is located on a tool such as a digital torque wrench, a digital caliper, etc. The detector 40 detects the signal when the worker uses the tool. The time-series detection data that is obtained is stored in the memory device 20 by the detector 40.

The detector 40 may be an acceleration sensor or an angular velocity sensor attached to a hand or foot of the worker. The detector 40 detects the acceleration or angular velocity of a part of the body of the worker. Multiple detectors 40 may be attached to the body of the worker. The detector 40 stores the obtained time-series detection data in the memory device 20.

Other than the image data and the detection data, the memory device 20 stores progress data of previous production, production master data related to various elements of production, manufacturing master data related to various elements of manufacturing, etc.

FIGS. 2A and 2B are tables illustrating production master data.

Production master data 100A and 100B shown in FIGS. 2A and 2B include a process column 101, a task column 102, a lead time column 103, and an available equipment column 104. The product is produced by multiple processes. A character string (a name or an ID) for identifying each process is registered in the process column 101. Each process includes not less than one task. Character strings for identifying the tasks are registered in the task column 102. A time necessary from the start to the end of one task related to the production is registered in the lead time column 103. Hereinafter, the lead time is called simply the "LT". In the illustrated example, "the number of devices that can be assembled in 1 hour" in each task is registered as the LT. The equipment that can be used in the task is registered in the available equipment column 104.

FIGS. 3A to 3D are tables illustrating manufacturing master data.

The manufacturing master data includes individual master data and equipment operation master data for each worker. FIGS. 3A to 3C are examples of individual master data 110A to 110C related to workers X to Z. The individual master data 110A to 110C includes a worker column 111, a task column 112, a skill level column 113, a lead time column 114, and a yield column 115. Character strings for identifying the workers are registered in the worker column 111. Character strings for identifying the tasks are registered in the task column 112. The skill levels (the proficiencies) of the workers related to the tasks are registered in the skill level column 113. The LTs of the workers in the tasks are registered in the lead time column 114. The yields of the workers in the tasks are registered in the yield column 115. The LT that is registered in the production master data has a relationship with the LT registered in the manufacturing master data. In the manufacturing master data, the LT is registered for each worker and for each task. In the production master data, the average LT for each task by one worker or more is registered. When the LT of one of the workers is improved in the manufacturing master data, the LT of the production master data also may be improved.

FIG. 3D is an example of equipment operation master data 120. The equipment operation master data 120 includes an equipment column 121 and a downtime ratio column 122.

Character strings for identifying each equipment are registered in the equipment column 121. A temporary downtime ratio of each equipment is registered in the downtime ratio column 122. "Temporary downtime" refers to a shutdown of several minutes to several tens of minutes. Temporary downtime may occur due to minor equipment trouble, raw material to be used not reaching the equipment, etc.

The production management device 10 uses various data to generate a long-term plan. The long-term plan is a production plan for a longer period than a short-term plan described below. A long period of time is, for example, several weeks to several months. The long-term plan also may be called a "production schedule", a "master schedule", etc. As an example, the long-term plan specifies the number of products of each product type to be produced in several days to one week within a period of two to three months, the schedule from the production start to the production completion of each product, etc.

The production management device 10 generates the short-term plan based on the long-term plan. The short-term plan is a production plan of a shorter period than the long-term plan described above. A short period of time is, for example, one day. The short-term plan also may be called an "input plan", a "minor schedule", etc. As an example, the short-term plan specifies the product types of products to be produced, the number of products, the tasks to be performed, the start time of each task, the worker to perform each task, etc., for one day. Hereinafter, an example is described in which the short-term plan specifies the plan of the production of one day.

The production management device 10 generates the long-term plan and the short-term plan by using a generally-available scheduler. Examples of available schedulers include FLEXSCHE (registered trademark), Asprova (registered trademark), JoyScheduler (registered trademark), etc. The long-term plan and the short-term plan are generated by referring to process master data, resource master data, product configuration master data, work schedule master data, etc., in addition to the production master data and the manufacturing master data described above.

The names of the processes, the sequence of the processes, the standard LTs of the processes, etc., are registered in the process master data. The LTs of the process master data are common to the LTs of the production master data. The names of the equipment used in the processes, the number of each equipment, the names of the workers that use each equipment, the number of workers, etc., are registered in the resource master data. Raw materials to be used, processed products partway through production, assembled products partway through production, finished products (products), etc., are registered in the product configuration master data; and the product configuration master data defines the flow until the product is completed.

The working hours of the workers, the overtime hours of the workers, the work days of the workers, etc., are registered in the work schedule master data. The master data that is used to generate the plan is prestored in the memory device 20.

FIG. 4A is an example of a long-term plan. FIG. 4B is an example of a short-term plan.

FIG. 4A shows results in which only the plan of the task that starts on "February 1" is extracted from a long-term plan of several months of production of the device of a model A. In the long-term plan 130 shown in FIG. 4A, members related to the device are planned to be received on "February 1"; and twelve devices are planned to be shipped by February 5. FIG. 4B shows a part of the short-term plan generated based on the plan of FIG. 4A. FIG. 4B shows the short-term plan for "February 2". In the short-term plan 140, the number of components or partly-finished products to be input to the work site, the times of the tasks, the workers to perform the tasks, the equipment to be used, etc., are planned. Among the illustrated tasks, "transfer" refers to transporting the members to the work area. "Input" refers to using the members to produce the product.

The tasks of one day are performed according to the pre-generated short-term plan. After starting the task, the imaging device 30 acquires image data; and the detector 40 acquires detection data. The data may be continuously acquired by the imaging device 30 and the detector 40 from before starting the task. The production management device 10 acquires the image data and the detection data. The production management device 10 uses one or both of the image data and the detection data to calculate progress data of the progress of the task to be performed. The progress data that is calculated includes the LT of the task. A specific method for calculating the progress data based on the image data or the detection data will now be described.

The production management device 10 uses the image data to identify the articles that are the object of the task. The identification discriminates the types of the articles, the number of articles per type, etc. The articles are the object of the task and are components, partly-finished products, finished products, etc. For example, single components and combinations of components are identified as mutually-different types of articles. When a component is mounted to a partly-finished product, the partly-finished product to which the component is mounted is identified as a different type of article than a partly-finished product to which the component is not mounted.

A discriminative model for identifying the articles in the image is used to identify the articles. It is favorable for the discriminative model to include a neural network. To increase the identification accuracy, it is more favorable for the discriminative model to include a convolutional neural network (CNN). The discriminative model is pretrained to output the number of articles in the image for each type according to the input of the image data. Image data and teaching data are used for the training. The teaching data teaches the positions of the articles in the image, the types of the articles, the number of articles of each type, etc.

The production management device 10 inputs the image data to the discriminative model and acquires the types and numbers of the articles in the image. The production management device 10 stores the identification results in the memory device 20 by associating the identification results with the imaging times of the images. The change of the types and numbers of the articles corresponds to the state of progress of the task. For example, based on the change of the number of articles of each type, the production management device 10 estimates, as progress data, the LT of one task, the state of progress of the task, the number of tasks performed up to that point, etc.

Figure 5A:
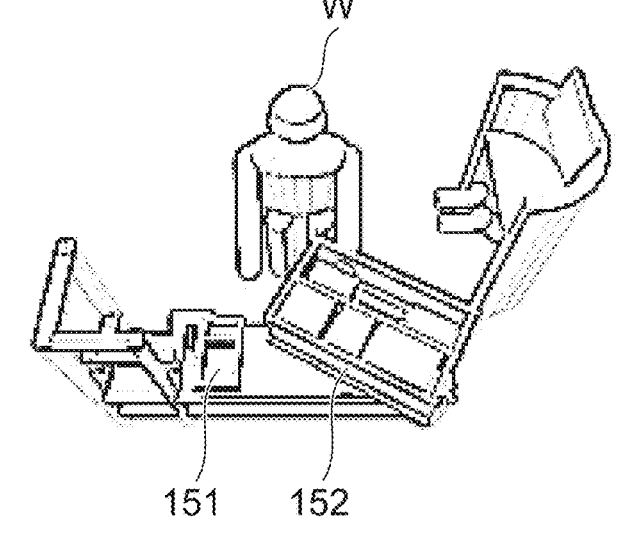
FIG. 5A is a schematic view showing the state of the task.
Figure 5B:
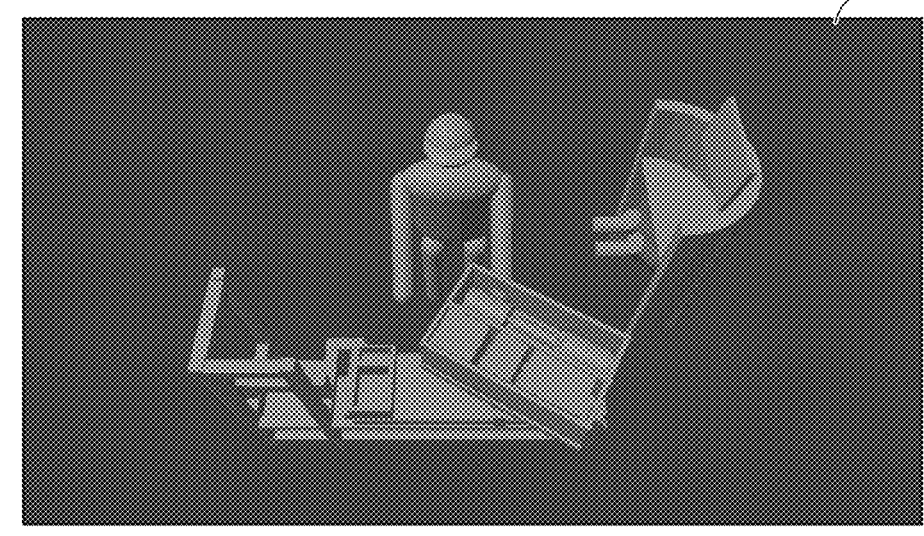
FIG. 5B is an image corresponding to FIG. 5A.
Figure 5C:
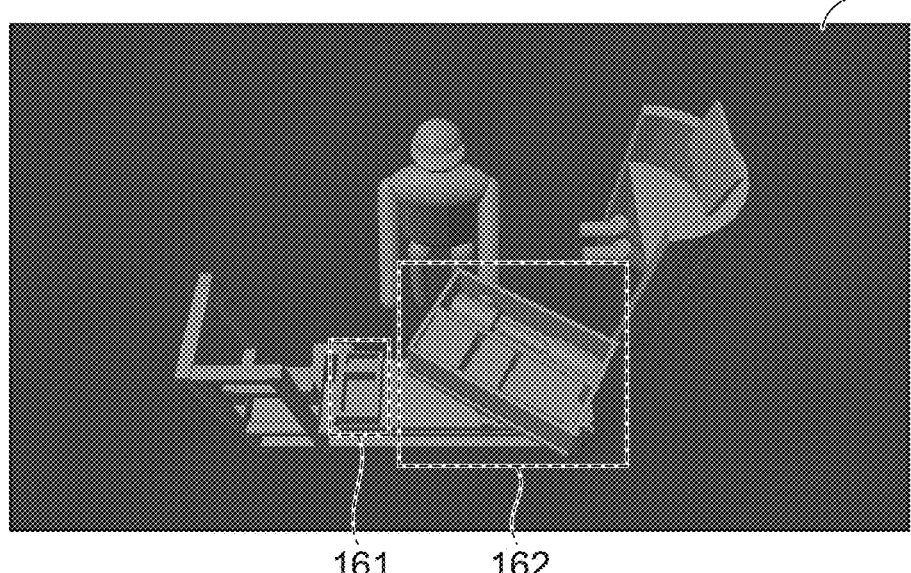
FIG. 5C is a schematic view showing an example of the identification result.

FIG. 5A is a schematic view showing the state of the task. FIG. 5B is an image corresponding to FIG. 5A. FIG. 5C is a schematic view showing an example of the identification result.

In the example shown in FIG. 5A, a worker W performs a task of mounting a component 151 to a partly-finished product 152. FIG. 5B shows image data 160 obtained by the imaging device 30 imaging the task shown in FIG. 5A. When the image data 160 is acquired, the production management device 10 inputs the image data 160 to a discriminative model. For example, as shown in FIG. 5C, the discriminative model outputs an identification result 161 corresponding to the component 151 and an identification result 162 corresponding to the partly-finished product 152. The production management device 10 identifies the articles in the image based on the output result from the discriminative model.

The task of mounting the component 151 to the partly-finished product 152 can be estimated to be completed when the number of the components 151 decreases and the number of finished products in which the component 151 is mounted to the partly-finished product 152 increases. When the same task is repeated, the increased number of finished products corresponds to the number of times that the task is performed. The pace at which the number of finished products increases corresponds to the LT. The difference between the reduced number of the components 151 and the increased number of finished products corresponds to the number of defective parts. Such progress data that is estimated based on the identification result is stored in the memory device 20 by the production management device 10.

Other than the image data, the production management device 10 uses template matching using the detection data to estimate the task being performed by the worker, the LT of the task, etc. For example, the detector 40 includes at least one selected from a torque sensor, an acceleration sensor, and an angular velocity sensor and is embedded in a tool (a wrench or a caliper). When the tool is used in the task, the detector 40 detects a signal that is different from when the tool is not being used. The detector 40 continuously detects the signal. Time-series detection data is obtained thereby.

The production management device 10 refers to a preset work standard. The tasks to be performed, the sequence of the tasks, the standard times of the tasks, etc., are registered in the work standard. The production management device 10 cuts out a part of the time-series detection data. The length of the cut-out data may be fixed or may be set based on the standard time. Herein, the data of a part cut out from the entire data of the time series is called "partial data".

The production management device 10 compares the partial data with the template data prepared beforehand. The template data is prepared for each task registered in the work standard. The likelihood of the worker performing a task corresponding to the template data increases as the similarity between the waveform of the partial data and the waveform of the template data increases. The production management device 10 calculates the similarities between the waveform of the partial data and the waveforms of the template data. The similarities are calculated using dynamic time warping (DTW), etc. The production management device 10 extracts a combination of the partial data and the template data for which the maximum similarity is obtained. When the similarity of the combination is greater than a preset threshold, the production management device 10 estimates that a task corresponding to the template data is being performed.

The production management device 10 may cut out a part of the detection data while changing the time at which the cutout is started. The production management device 10 compares multiple sets of partial data having different start times with the template data. The task that is being performed is estimated based on the similarities between template data and the partial data.

Figure 6A:
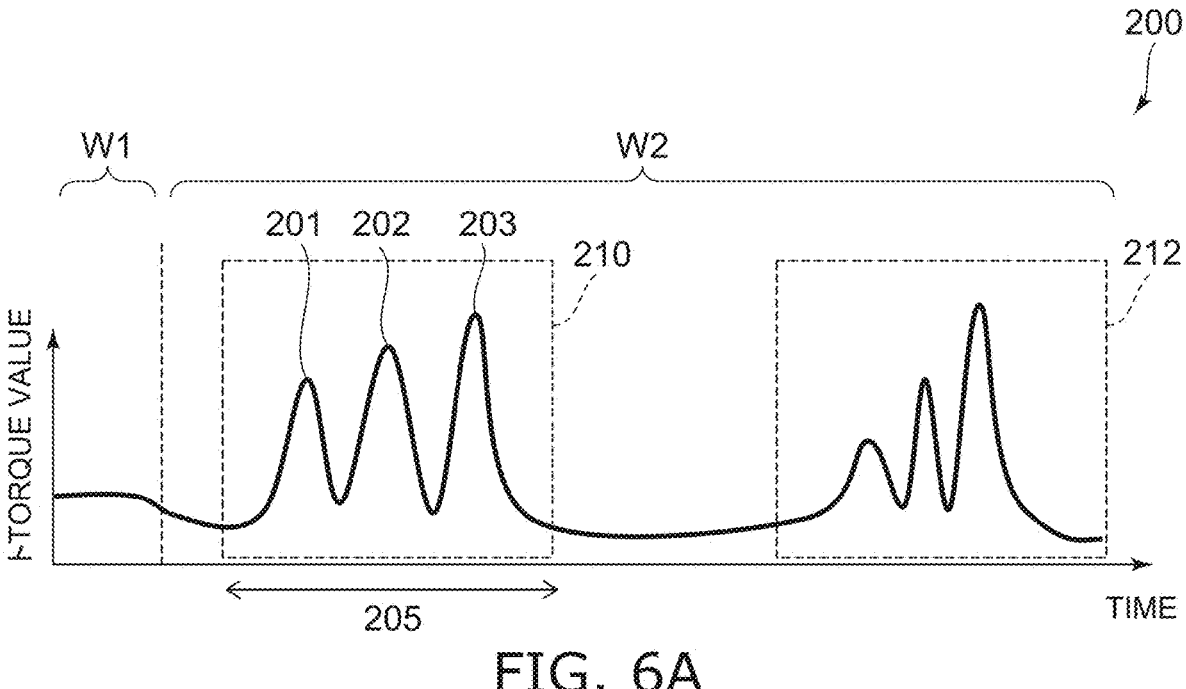
FIG. 6A is a schematic view showing time-series detection data obtained by a detector.
Figure 6B:
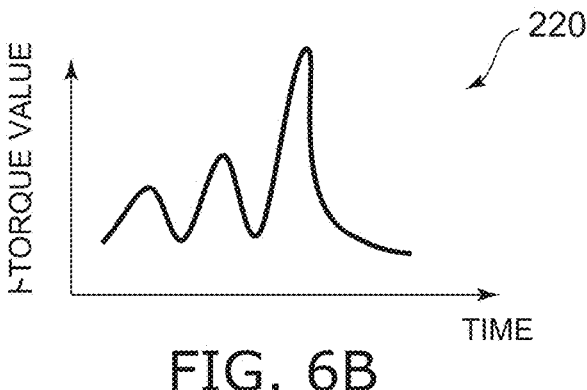
FIG. 6B is a schematic view showing template data.

FIG. 6A is a schematic view showing time-series detection data obtained by a detector. FIG. 6B is a schematic view showing template data.

FIG. 6A shows detection data 200 from the detector 40 embedded in a wrench. In such a case, a large signal that accompanies the tightening of a bolt is detected. The number of times a large signal is detected corresponds to the number of times a bolt is tightened and the number of bolts. The magnitude of the signal corresponds to the strength of the tightening. The interval between the large signals corresponds to the timing of the tightening. In the example of FIG. 6A, the worker performs a task W2 after a task W1. Two bolts are tightened in the task W2. The worker tightens each bolt three times. Therefore, three peaks 201 to 203 are detected for the tightening of one bolt.

The production management device 10 cuts out data having a duration 205 from the detection data 200. The production management device 10 compares partial data 210 with template data of the tasks that can be performed after the task W1. FIG. 6B shows an example of template data 220 corresponding to the task W2. The template data 220 includes the waveform when one bolt is tightened. A high similarity is obtained between the partial data 210 and the template data 220. As a result, the production management device 10 estimates that the worker is performing the task W2. The production management device 10 adds up the number of bolts tightened based on matching between the template data and partial data 212 that is after the partial data 210. For example, the number of bolts tightened in the task W2 is registered in the work standard. The production management device 10 can estimate the state of progress of the task W2 by comparing the number of bolts added up and the number of bolts registered in the work standard.

The production management device 10 estimates the LT based on the estimation result of the task. The estimation method of the LT is arbitrary. For example, the time from the task that is directly previously estimated to the next estimated task may be estimated as the LT of one task. The template data may be prepared to estimate the start and the end of one task, and the LT may be estimated based on the result of matching using the template data. Template data that corresponds to one entire task may be prepared, and template matching may be performed while changing the period at which the partial data is cut out. In such a case, the length (the time) of the partial data for which the maximum similarity is obtained is estimated as the lead time. When a specific task is repeated, the LT of one average task may be calculated by dividing the time until the multiple tasks are performed by the number of times that the task is performed.

When the worker repeats only a specific task, the template data that is compared with the detection data may be specified. For example, when the worker repeatedly performs only the task W2, the production management device 10 compares the partial data with only the template data 220. The production management device 10 repeats the cutting out of the data and the matching between the partial data and the template data 220. As a result, the production management device 10 can estimate the state of progress of one task W2, the number of times that the task W2 has been performed to date, the LT of the task W2, etc.

The LT and the task being performed are estimated similarly to the method described above even when the detector 40 is an acceleration sensor or an angular velocity sensor attached to the worker. The multiple detectors 40 may be attached to the worker. In such a case, template data is prepared for each part of the body of the worker. For each set of detection data, the production management device 10 compares the template data and the obtained partial data and estimates that the task of the template data having the maximum similarity is being performed.

Time-series data may be acquired from image data. The production management device 10 detects the pose of the worker in the image. Pose detection is used to detect the skeleton of the worker. The production management device 10 calculates the position of a specific part (e.g., the head) inside the image. The production management device 10 continuously acquires images or acquires a video image. The production management device 10 calculates the position of a specific part based on the temporally consecutive multiple images. Time-series data of the continuous change of the position of the specific part is obtained thereby. By using the time-series data, the task being performed and the lead time of the task may be estimated similarly to the method described above.

Different data for each task may be used in the estimation. For example, the LT, the state of progress of the task, and the number of task repetitions are estimated from the change of the number of each type of article in the image in the task performed by the worker. The LT, the state of progress of the task, and the number of task repetitions are estimated from matching between template data and at least a part of detection data for another task performed by another worker. Or, the LT, the state of progress of the task, and the number of task repetitions may be estimated by combining template matching and the change of the number of each type of article in the image for one task.

The production management device 10 repeats the identification of the articles based on the image data and the template matching based on the detection data while the production task is performed according to the short-term plan. Thereby, the production management device 10 obtains the progress data for the workers. The progress data includes the LT, the number of task repetitions, etc., in a part of the short-term plan that is performed.

The production management device 10 uses the obtained progress data to predict the progress in another part of the short-term plan for each of the workers. As an example, the short-term plan specifies the task schedule of one day of each worker. The production management device 10 uses the image data or the detection data obtained in the morning to estimate the LT of the task of the morning for one worker. The production management device 10 uses the estimated LT to predict the LT of the afternoon task of that day for the worker.

The production management device 10 uses a first prediction model to predict the progress. It is favorable for the first prediction model to include a neural network. To increase the prediction accuracy, it is more favorable for the first prediction model to include a recurrent neural network (RNN). The first prediction model is pretrained to output a prediction of the progress according to the input of the data. Progress data that was obtained in a previous task is used in the training. A part of the progress data is used as the input data, and another part of the progress data is used as the teaching data to be predicted.

Other than the progress data, the production management device 10 may input other data that affects the LT to the first prediction model. For example, environment data, biological data of the worker, etc., that indicate the environment of the work site may be input to the prediction model by the production management device 10. The environment data includes at least one selected from the temperature, the humidity, and the air pressure. The biological data includes at least one selected from the body temperature, the pulse rate, the blood pressure, the body motion, the electrocardio-graphic potential, the perspiration rate, the percutaneous arterial oxygen saturation, and the breathing rate. The biological data can be acquired by a wearable sensor attached to the worker.

Figures 7A, 7B:
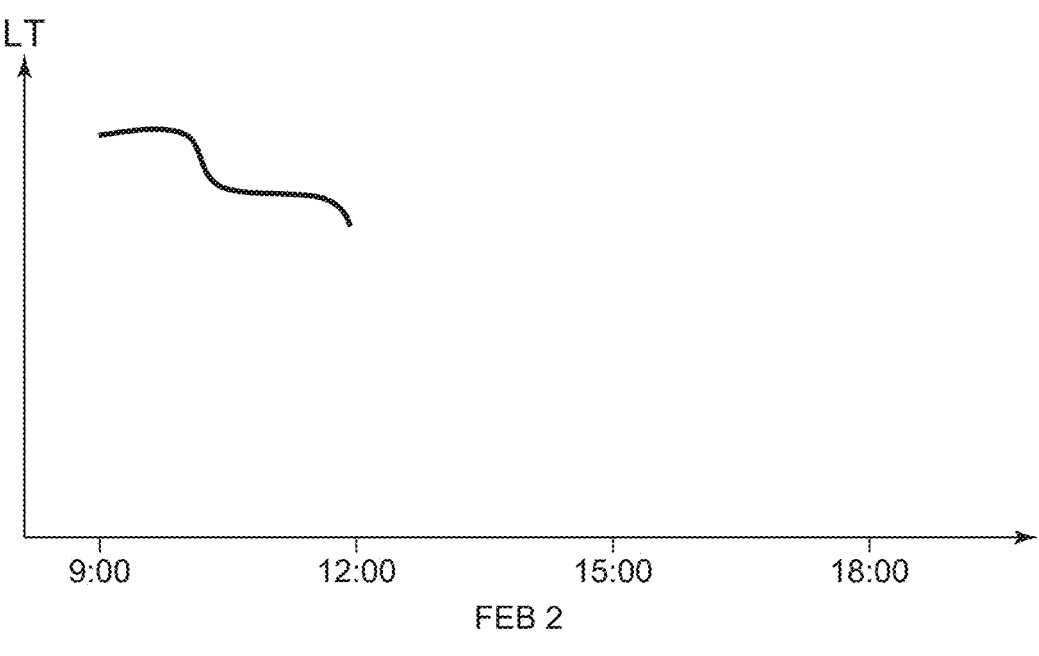
FIG. 7A is a schematic view showing the progress of a part of the short-term plan.
FIG. 7B is a schematic view showing a prediction of another part of the short-term plan.

FIG. 7A is a schematic view showing the progress of a part of the short-term plan. FIG. 7B is a schematic view showing a prediction of another part of the short-term plan.

In FIGS. 7A and 7B, the horizontal axis is the time. The vertical axis is the LT. In FIG. 7B, the estimated LT of the task performed according to a part of the short-term plan is illustrated by the solid line. The predicted LT of the task to be performed in the future according to another part of the short-term plan is illustrated by the broken line. As shown in FIGS. 7A and 7B, the production management device 10 predicts the LT by using the estimated progress data and the prediction model.

The production management device 10 uses the predicted LT to revise the short-term plan. First, the production management device 10 compares the predicted LT and the short-term plan. The short-term plan specifies the number of times that the task is to be performed. When the predicted LT is greater than the standard, there is a possibility that the specified number of tasks cannot be performed, and it is necessary to reduce the number of task repetitions. When the predicted LT is less than the standard, the task can be performed more times.

FIG. 8A is a table showing a pre-generated short-term plan. FIG. 8B is a table showing a revised short-term plan.

In the example of FIG. 8A, the worker X and the worker Y are planned to assemble two devices of the model A in the morning, two in the first half of the afternoon, and two in the latter half of the afternoon. For example, FIGS. 7A and 7B show the progress and the prediction of the worker X. As shown in FIGS. 7A and 7B, when a reduction of the LT of the worker X is predicted, the worker X can assemble more devices thereafter. Based on the prediction result of the LT, the production management device 10 increases the number of devices to be assembled by the worker X in the afternoon as shown in FIGS. 8A and 8B.

When the short-term plan is revised, the production management device 10 may transmit a notification to a preset terminal device. For example, the production management device 10 transmits the revised number of input devices to a terminal device possessed by a transport worker. By transmitting at least a part of the revised short-term plan, it is easier for the worker to perform the task according to the short-term plan after the revision.

For example, the revision of the short-term plan is notified to the worker by a sound, light, or vibration from a wearable terminal device on the body of the worker. The terminal device may be a smartphone, a tablet, smart glasses, etc., that includes a display function. In such a case, the terminal device displays the short-term plan after the revision or the revision content of the short-term plan toward the worker.

Figure 9A:
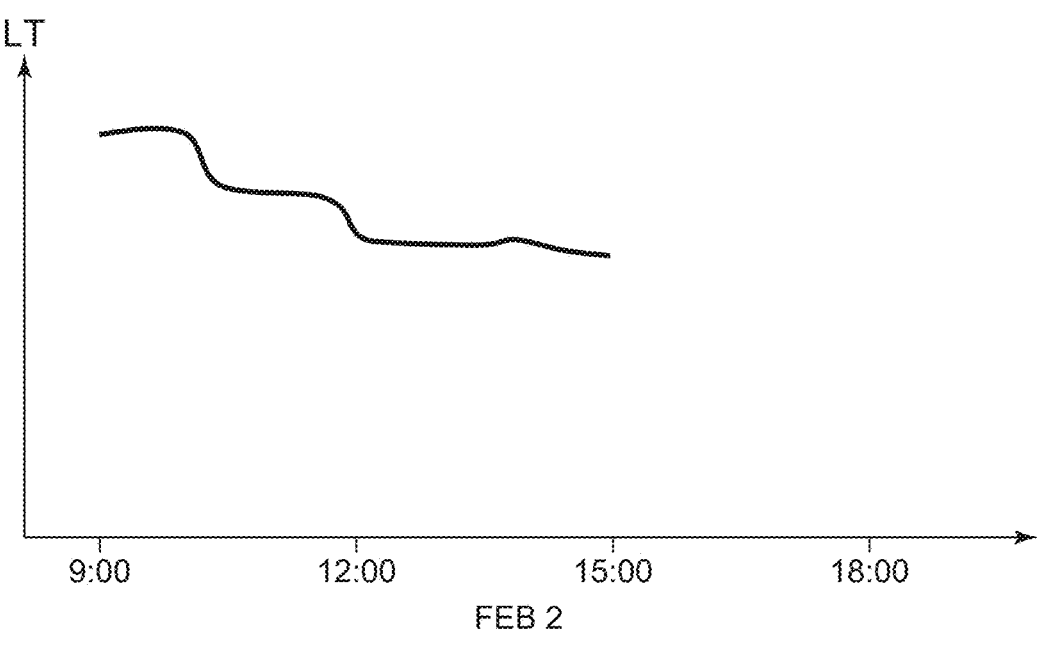
FIG. 9A is a schematic view showing the progress of a part of the short-term plan after the revision.
Figure 9B:
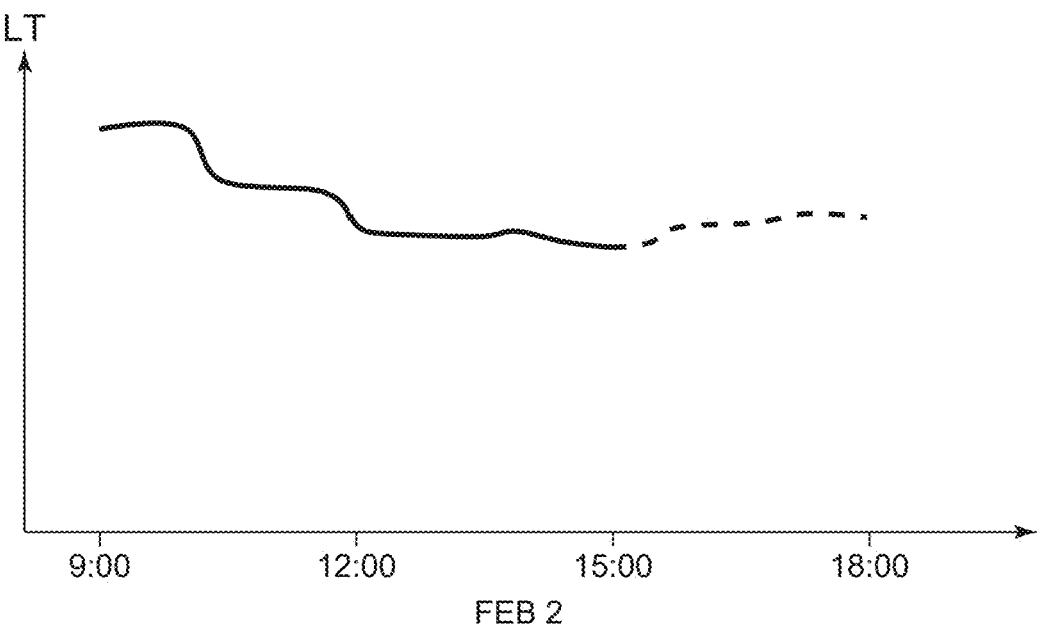
FIG. 9B is a schematic view showing a prediction of another part of the short-term plan after the revision.

FIG. 9A is a schematic view showing the progress of a part of the short-term plan after the revision. FIG. 9B is a schematic view showing a prediction of another part of the short-term plan after the revision.

FIG. 10A a table showing the revised short-term plan. FIG. 10B is a table showing the short-term plan after being revised again.

In FIGS. 9A and 9B, the horizontal axis is the time. The vertical axis is the LT. In FIG. 9B, the estimated LT of the task performed according to a part of the revised short-term plan is illustrated by the solid line. The predicted LT of the task performed in the future according to another part of the revised short-term plan is illustrated by the broken line. The revised short-term plan may be further revised based on progress data acquired subsequently.

FIG. 9A shows the LT when the worker X has performed the task of the first half of the afternoon according to the revised short-term plan. Based on the progress in the task of the morning and the first half of the afternoon, the production management device 10 predicts the LT in the task of the latter half of the afternoon as shown in FIG. 9B. In the illustrated example, the LT is not reduced compared to the prediction shown in FIG. 7B. Based on the prediction result, the production management device 10 reduces the number of devices to be assembled by the worker X as shown in FIGS. 10A and 10B. Thus, the production management device 10 can repeatedly revise the short-term plan by using the image data or the detection data acquired in real time during the task.

When the tasks of one day according to the short-term plan are finished, the production management device 10 acquires the progress data of the progress of the tasks of the one day. Similarly to the progress data of the part of the short-term plan described above, the progress data includes the LT, the number of task repetitions performed, etc. The progress data is acquired for each worker. The production management device 10 acquires long-term prediction data for each worker by using the acquired progress data and the previous progress data. The prediction data represents a prediction of the progress of the tasks in a prescribed period (several weeks to several months). For example, the prediction data includes the LT, the number of task repetitions to be performed, etc., per day in the prescribed period.

The production management device 10 uses a second prediction model to predict the progress. Compared to the first prediction model, the second prediction model is for predicting the progress over a longer period of time. It is favorable for the second prediction model to include a neural network. To increase the prediction accuracy, it is more favorable for the second prediction model to include an RNN. The second prediction model is pretrained to output a prediction of the progress according to the input of the data. Previous long-term progress data is used in the training. A part of the progress data is used as the input data; and another part of the progress data is used as the teaching data to be predicted. Similarly to the first prediction model, environment data, biological data, etc., may be input to the second prediction model.

The production management device 10 updates the production master data and the manufacturing master data based on the prediction data output from the second prediction model. First, the production management device 10 updates the LT of the manufacturing master data for each worker based on the prediction data for each worker. The production management device 10 updates the LT of the production master data based on the LT of the updated manufacturing master data.

Figure 11A:
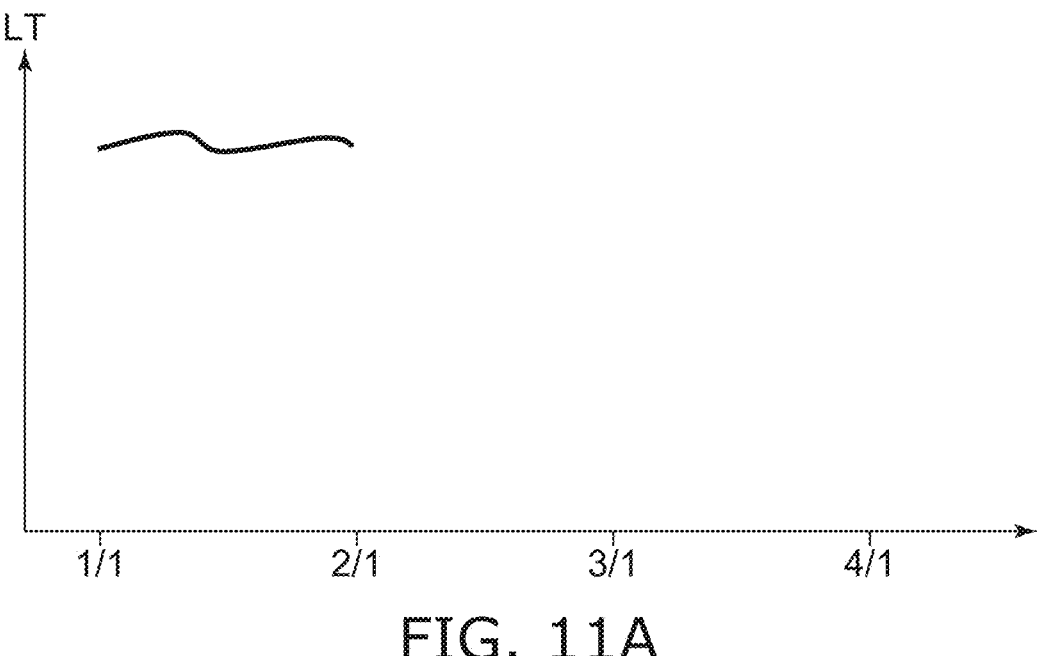
FIG. 11A is a schematic view showing the progress of a part of the prescribed period.
Figure 11B:
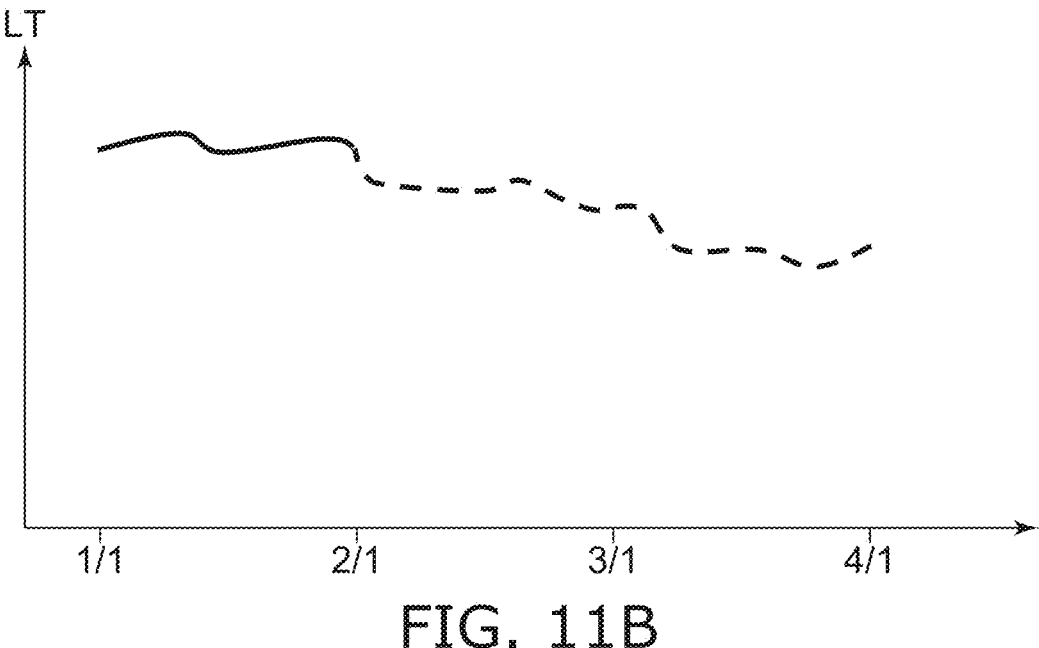
FIG. 11B is a schematic view showing a prediction of another part of the prescribed period.

FIG. 11A is a schematic view showing the progress of a part of the prescribed period. FIG. 11B is a schematic view showing a prediction of another part of the prescribed period.

In FIGS. 11A and 11B, the horizontal axis is the time. The vertical axis is the LT. The progress of the task of "February 2" is obtained when the task of "February 2" is performed according to the short-term plan shown in FIG. 4B, FIG. 8B, and FIG. 10B. The production management device 10 refers to the progress data of "February 2" shown in FIG. 11A and the progress data before "February 2". The production management device 10 uses this progress data to predict on and after "February 3" in the future as shown in FIG. 11B.

FIG. 12A is a table illustrating the updated manufacturing master data. FIG. 12B is a table illustrating the updated production master data.

For example, FIGS. 11A and 11B are the progress and the prediction of the worker X. When a reduction of the LT of the worker X is predicted over the long term as shown in FIGS. 11A and 11B, the production management device 10 updates the LT of the manufacturing master data related to the worker X as shown in FIG. 12A. As shown in FIG. 12B, the production management device 10 updates the LT of the task related to the worker X in the production master data according to the update of the manufacturing master data.

The production management device 10 uses the updated production master data to generate a new long-term plan. As described above, a scheduler can be utilized to generate the long-term plan. Based on the new long-term plan and the updated manufacturing master data, the production management device 10 generates the short-term plan of the next day.

Thereafter, the processing described above is repeated. Namely, the task related to the production according to the new short-term plan is performed on the next day. The subsequent progress is predicted from the progress of the task performed according to a part of the short-term plan. The short-term plan is revised based on the prediction result of the progress. When the next day is finished, the progress of the task is used to generate a new long-term plan and a new short-term plan.

The LT and the number of times that the task is performed are mainly used as the progress in the example described above. Other than the example, the yield may be used as the progress. For example, the production management device 10 summarizes the defective part occurrence count of the task performed according to a part of the short-term plan. The occurrence of defective parts is determined based on the input to a specific terminal device, the identification result of the number of articles in a defective part storage location, etc. The production management device 10 predicts the number of defective parts in the task performed according to another part of the short-term plan based on the summarized number of defective parts. A prediction model other than that of the LT prediction is used to predict the number of defective parts. The production management device 10 revises the short-term plan based on the predicted number of defective parts. The production management device 10 summarizes the defective part occurrence count in the task of one day and uses the summarized number to predict the number of defective parts in the prescribed period. Based on the predicted number of defective parts, the manufacturing master data and the production master data are updated, and a new long-term plan and a new short-term plan are generated.

Another corresponding expression such as the number of good parts, the defective part occurrence rate, the yield rate, etc., may be used as the number of defective parts. The production management device 10 may use both the number of defective parts and the LT to revise the short-term plan, update each set of master data, etc.

Figure 13:
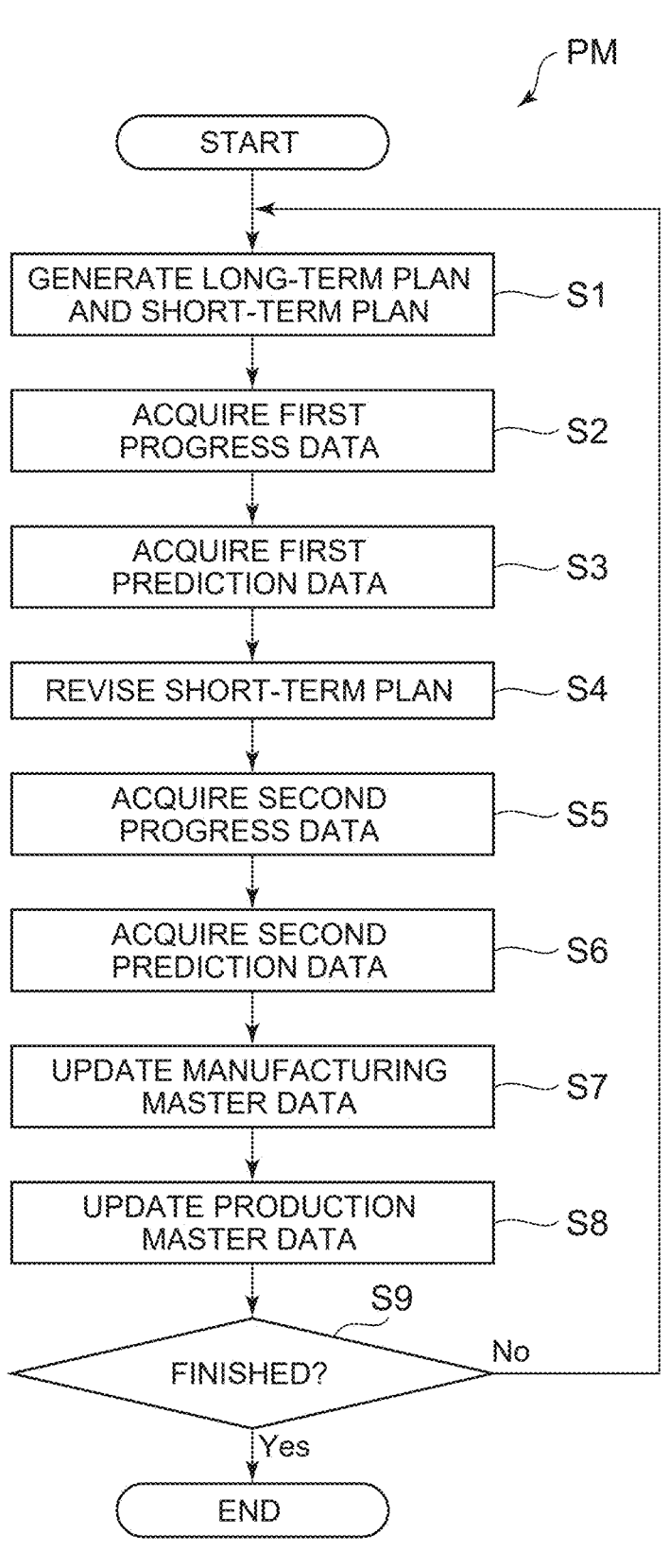
FIG. 13 is a flowchart showing a production management method according to the embodiment.

FIG. 13 is a flowchart showing a production management method according to the embodiment.

In the production management method PM shown in FIG. 13, first, the production management device 10 generates a long-term plan (a first long-term plan) of the production plan in the prescribed period and a short-term plan (a first short-term plan) of the production plan in a first period (step S1). The long-term plan and the short-term plan are generated based on various master data. The task that is related to the production according to a part of the short-term plan is performed. The production management device 10 acquires first progress data in the task (step S2). The production management device 10 uses the first progress data to acquire first prediction data (step S3). The first prediction data includes a prediction of the progress in the task of another part of the short-term plan performed subsequently. The production management device 10 revises the short-term plan based on the first prediction data (step S4). Steps S2 to S4 may be repeated a preset number of times. The production management device 10 acquires second progress data of the progress in the task in the first period (step S5). The production management device 10 uses the second progress data and previous progress data to acquire second prediction data of a prediction of the progress of the production in the prescribed period (step S6). The production management device 10 updates manufacturing master data based on the second prediction data (step S7). The production management device 10 updates production master data based on the updated manufacturing master data (step S8). The production management device 10 determines whether or not the end condition of the processing is satisfied (step S9). The end condition is when a stop instruction from a user is received, the processing is performed for a pre-specified number of times, etc. Step S1 is performed again when the end condition is not satisfied.

For example, by re-performing step S1, the updated production master data and manufacturing master data are used to generate a new long-term plan (a second long-term plan) and a short-term plan (a second short-term plan) of the production plan in a second period that is after the first period. Third progress data of the progress in the task performed according to a part of the new short-term plan is acquired. The third progress data is used to acquire third prediction data of a prediction of the progress in the task performed according to another part of the new short-term plan. A new second short-term plan is revised based on the third prediction data. Thus, the acquired progress and the prediction based on the progress are used to repeat the revision of the short-term plan, the generation of the new long-term plan and the short-term plan, etc.

Figure 14:
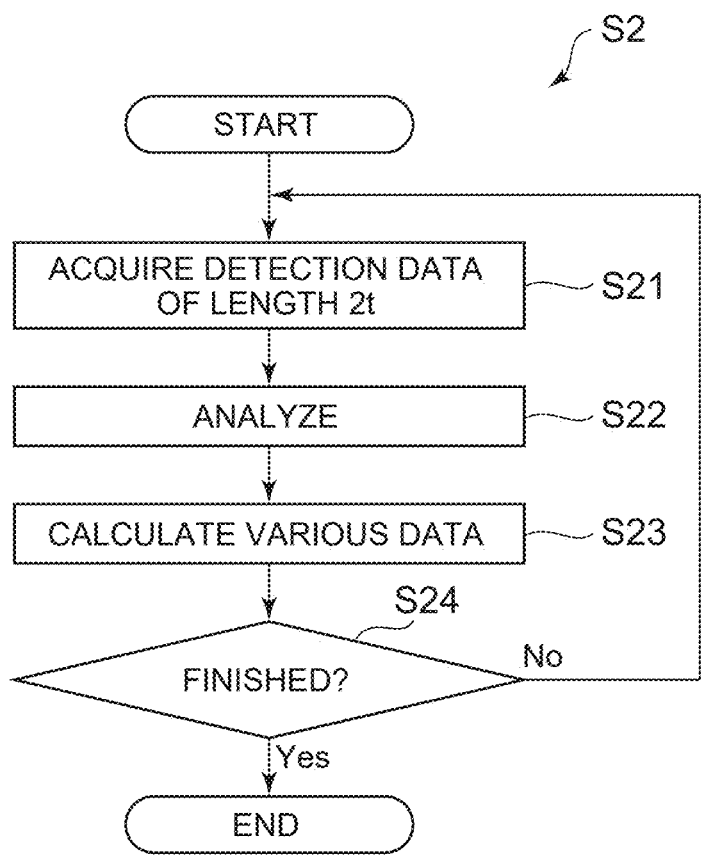
FIG. 14 is a flowchart showing specific processing of the production management device according to the embodiment.
Figure 15:
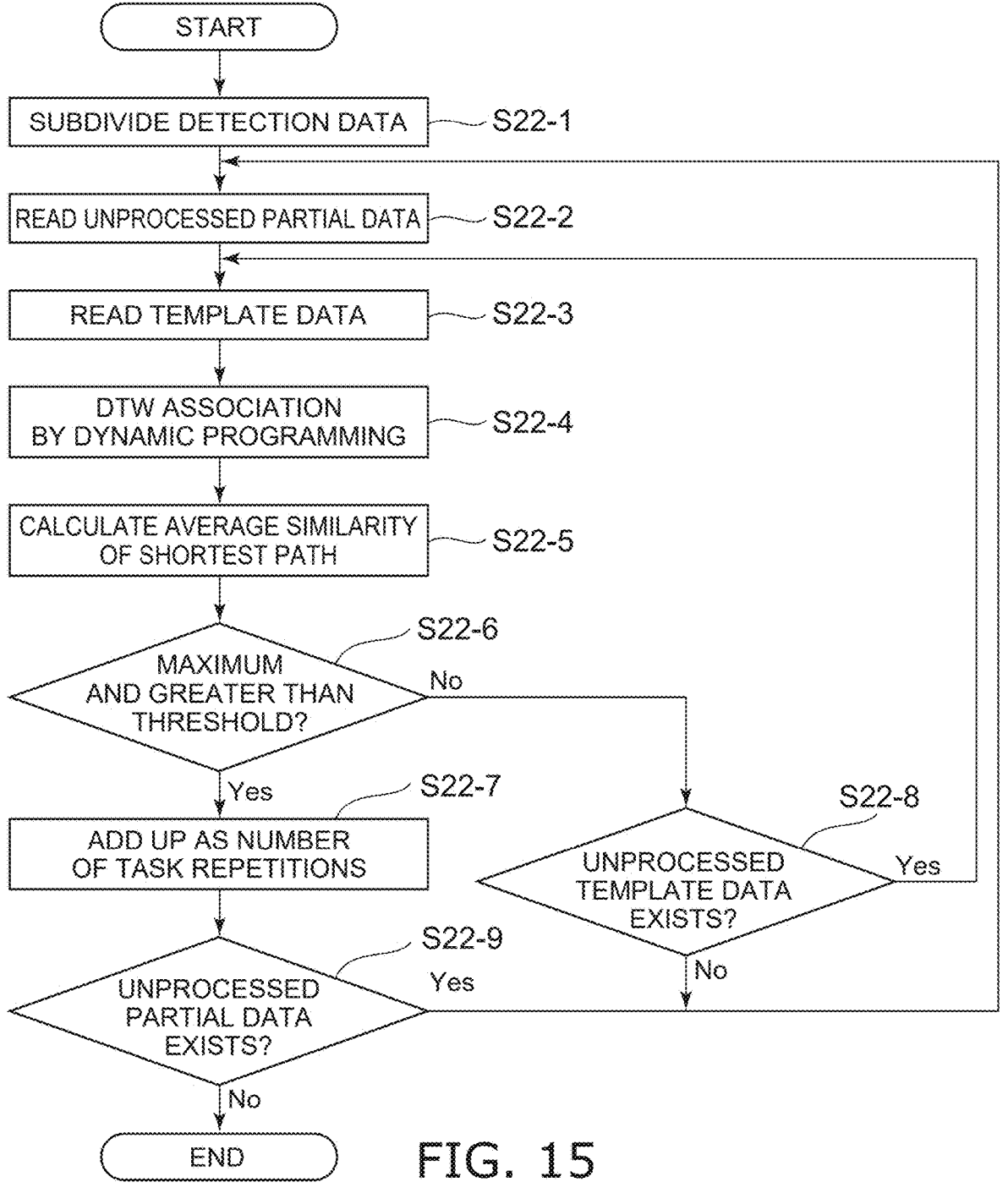
FIG. 15 is a flowchart showing specific processing of the production management device according to the embodiment.

FIGS. 14 and 15 are flowcharts showing specific processing of the production management device according to the embodiment.

An example of the specific estimation method of the progress of step S2 shown in FIG. 13 is described with reference to FIGS. 14 and 15. First, the production management device 10 acquires data having a length of 2t from the detection data (step S21). "t" is a preset value. t may be set based on the standard task time registered in the work standard. The production management device 10 analyzes the acquired data (step S22). The production management device 10 calculates various data related to the progress based on the analysis result (step S23). The production management device 10 determines whether or not the end condition is satisfied (step S24). Step S21 is performed again when the end condition is not satisfied.

FIG. 15 shows an example of the specific processing of the analysis of step S22. In the example, the analysis is performed by using detection data acquired from the detector 40. First, the production management device 10 subdivides the detection data having the length of 2t (step S22-1). For example, in the provisional subdivision, the detection data is uniformly divided into a preset length. Multiple sets of partial data are obtained thereby. The production management device 10 reads unprocessed partial data from the multiple sets of partial data (step S22-2). The production management device 10 reads, from the multiple sets of template data (step S22-3), unprocessed template data for which the similarity with the partial data that was read has not been calculated. The production management device 10 uses dynamic programming to perform DTW to associate the template data and the partial data (step S22-4). The production management device 10 determines the average similarity of the shortest paths obtained to be the similarity between the partial data and the template data (step S22-5).

The production management device 10 determines whether or not the obtained similarity is the maximum among the similarities obtained for the partial data read in step S22-2 directly before. Then, the production management device 10 determines whether or not the obtained similarity is greater than a preset threshold (step S22-6). When the obtained similarity is the maximum and is greater than the threshold, the production management device 10 estimates that a task that corresponds to the template data is performed in the period of the partial data. The production management device 10 includes the operation of the partial data in the estimated number of task repetitions (step S22-7). When the similarity obtained in step S22-6 is not the maximum or is not greater than the threshold, the production management device 10 determines whether or not there is any unprocessed template data for which the similarity to the partial data read in step S22-2 directly before has not yet been calculated (step S22-8).

When there is unprocessed template data, step S22-3 is re-performed, and the unprocessed template data is read. When there is no unprocessed template data or when step S22-7 is performed, the production management device 10 determines whether or not there is any unprocessed partial data (step S22-9). When there is unprocessed partial data, step S22-2 is re-performed, and the unprocessed partial data is read. When there is no unprocessed partial data, the production management device 10 ends step S22.

Advantages of the embodiment will now be described.

Generally, in production, a long-term plan and a short-term plan for the future are generated utilizing a production scheduler. Scheduling that uses the production scheduler can increase the efficiency of the production. In particular, the production scheduler can generate a plan that considers not only the LT of the task but also the LT of the transfer of the articles. Therefore, just-in-time production is possible if the plan that is generated can be executed.

On the other hand, there are many cases where deviations occur between the plan and the progress due to changes of the short-term concentration of the worker, proficiency differences between the workers, changes of the long-term proficiency of the worker, etc. Also, the maintenance frequency of master data such as the LT, yield, and the like that are necessary to generate the plan is low. There are cases where such data deviates from the actual values, and the production scheduler does not generate an accurate plan. Each time a deviation occurs between the plan and the progress, the person in charge of the plan reduces the deviation by adjusting the plan. However, such work requires many man-hours.

For this problem, the production management device 10 according to the embodiment uses the progress in the task performed according to a part of the short-term plan to predict the progress in the task performed according to another part of the short-term plan. For example, the LT is affected by the concentration of the worker. Even when the concentration of the worker changes throughout one day, the progress in the task of a part of the day is used to predict the progress in the subsequent task. Then, the production management device 10 revises the short-term plan based on the predicted progress. The deviation between the short-term plan and the actual production can be reduced by revising the short-term plan.

The production management device 10 uses the progress in a previous task to predict the progress of the production in a prescribed period. The production management device 10 uses the prediction to generate a new long-term plan and a new short-term plan. The deviation between the plan and the actual production over the long period of time also can be reduced thereby. A short-term plan that is based on the new long-term plan is further revised using the data when the short-term plan is executed.

Thus, the deviation between the plan and the actual production can be reduced by repeating the revision of the short-term plan, the generation of the new long-term plan, and the generation of the new short-term plan. In particular, the short-term plan can be revised in real time by using the image data, the detection data, etc., to analyze and estimate the task. It is also possible to repeatedly revise the short-term plan. According to the embodiment, a plan having a smaller deviation with the actual production can be generated. Thereby, the production can be even more efficient than conventionally.

The production management device 10 updates the master data based on a prediction of the long-term progress. Because the master data is automatically updated, it is unnecessary for a human to update the master data. The maintenance load of the master data by humans can be reduced.

Figure 16:
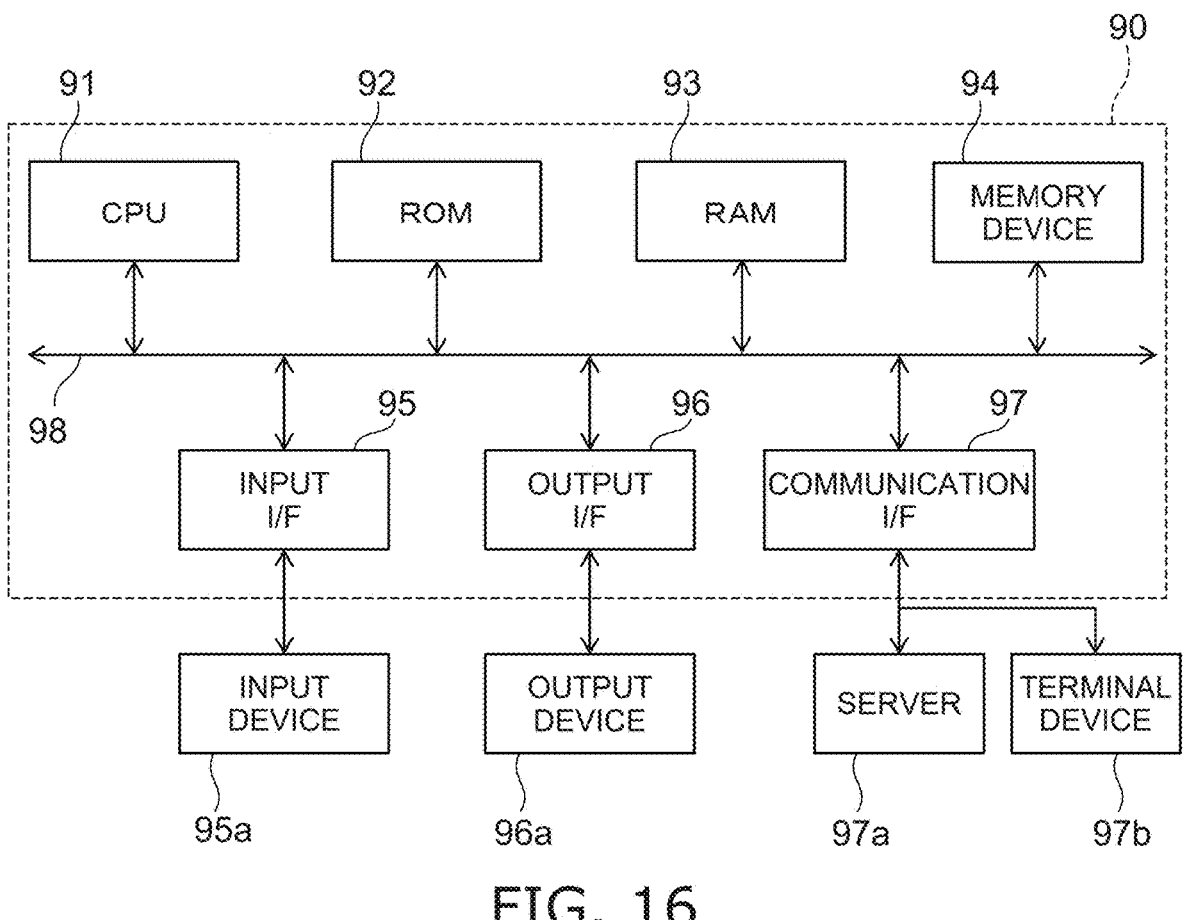
FIG. 16 is a schematic view showing a hardware configuration.

FIG. 16 is a schematic view showing a hardware configuration.

The production management device 10 includes, for example, the hardware configuration shown in FIG. 16. A computer 90 shown in FIG. 16 includes a CPU 91, ROM 92, RAM 93, a memory device 94, an input interface 95, an output interface 96, and a communication interface 97. The functions of the production management device 10 may be realized by one computer 90 or may be realized by a collaboration of multiple computers 90.

The ROM 92 stores programs that control the operations of the computer. Programs that are necessary for causing the computer to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the programs, the CPU 91 executes various processing by controlling configurations via a system bus 98.

The memory device 94 stores data necessary for executing the programs and/or data obtained by executing the programs.

The input interface (I/F) 95 connects the computer 90 and an input device 95a. The input I/F 95 is, for example, a serial bus interface such as USB, etc. The CPU 91 can read various data from the input device 95a via the input I/F 95.

The output interface (I/F) 96 connects the computer 90 and an output device 96a. The output I/F 96 is, for example, an image output interface such as Digital Visual Interface (DVI), High-Definition Multimedia Interface (HDMI (registered trademark)), etc. The CPU 91 can transmit data to the output device 96a via the output I/F 96 and cause the output device 96a to display an image.

The communication interface (I/F) 97 connects the computer 90 and a server 97a outside the computer 90. The communication I/F 97 is, for example, a network card such as a LAN card, etc. The CPU 91 can read various data from the server 97a via the communication I/F 97.

The computer 90 may communicate with a terminal device 97b via the communication I/F 97. The terminal device 97b is, for example, a smartphone, a tablet, smart glasses, a wearable terminal, etc., carried by a worker.

The memory device 94 includes at least one selected from a hard disk drive (HDD) and a solid state drive (SSD). The input device 95a includes at least one selected from a mouse, a keyboard, a microphone (audio input), and a touchpad. The output device 96a includes at least one selected from a monitor, a projector, a speaker, and a printer. A device such as a touch panel that functions as both the input device 95a and the output device 96a may be used. The memory device 94 may be used as the memory device 20.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

According to embodiments described above, a production management device, a production management system, a production management method, and a storage medium are provided in which a plan that has less deviation from the actual production can be generated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A production management device comprising processing circuitry, the processing circuitry being configured to:
acquire a first short-term plan generated based on a first long-term plan, the first long-term plan being of a plan of production in a prescribed period, the first short-term plan being of a plan of production in a first period shorter than the prescribed period, the first period including a first subperiod and a second subperiod after the first subperiod;

during the first subperiod, acquire at least one of
an image from an imaging device, the imaging device being configured to image a task performed according to a part of the first short-term plan, or
a time-series signal from a detector, the detector being configured to detect a signal generated by the task performed according to the part of the first short-term plan;

during the first subperiod, acquire first progress data of a progress in the task performed according to the part of the first short-term plan, the first progress data being calculated by using at least one of the image or the time-series signal;

before the second subperiod starts, acquire first prediction data by using the first progress data, the first prediction data being of a prediction of a progress in the task performed according to an other part of the first short-term plan in the second subperiod;

revise the first short-term plan based on the first prediction data;

acquire second prediction data by using second progress data, the second progress data being of a progress in the task in the first period, the second prediction data being of a prediction of a progress of the production in the prescribed period; and generate a second long-term plan in the prescribed period by using the second prediction data.

2. The production management device according to claim 1, wherein
the processing circuitry is configured to generate a second short-term plan based on the second long-term plan,
the second short-term plan is of a plan of production in a second period, and
the second period is after the first period and shorter than the prescribed period.

3. The production management device according to claim 2, wherein
the processing circuitry is configured to:
acquire third progress data of a progress in the task performed according to a part of the second short-term plan;
acquire third prediction data by using the third progress data, the third prediction data being of a prediction of a progress in the task performed according to an other part of the second short-term plan; and
revise the second short-term plan based on the third prediction data.

4. The production management device according to claim 1, wherein
the processing circuitry is configured to:
acquire other progress data of a progress in the task performed according to a part of the revised first short-term plan;
acquire other prediction data by using the other progress data, the other prediction data being of a progress in the task performed according to an other part of the revised first short-term plan; and
revise the revised first short-term plan based on the other prediction data.

5. The production management device according to claim 1, wherein
the first progress data includes a lead time in the task performed according to the part of the first short-term plan, and
the processing circuitry is configured to:
repeatedly acquire image data of the task;
identify a type and a number of an article imaged in each of a plurality of the image data; and
calculate the lead time by using a change of the type and the number of the article.

6. The production management device according to claim 1, wherein
the first progress data includes a lead time in the task performed according to the part of the first short-term plan, and
the processing circuitry is configured to:
acquire detection data of a signal generated by an operation of a worker performing the task, the detection data being time-series data; and
calculate the lead time based on a comparison result between template data and at least a part of the detection data.

7. The production management device according to claim 1, wherein
the second progress data includes a lead time in the task in the first period.

8. The production management device according to claim 1, wherein
the processing circuitry is configured to:
update master data by using the second prediction data; and
generate the second long-term plan by using scheduling based on the updated master data.

9. The production management device according to claim 1, wherein
the processing circuitry is configured to acquire the first prediction data by inputting the first progress data and environment data to a prediction model,
the environment data is of an environment of the production, and
the prediction model includes a neural network.

10. A production management device comprising processing circuitry,
the processing circuitry being configured to:
acquire a short-term plan generated based on a long-term plan, the long-term plan being of a plan of production in a prescribed period, the short-term plan being of a plan of production in a first period, the first period being shorter than the prescribed period, the first period including a first subperiod and a second subperiod after the first subperiod;
during the first subperiod, acquire at least one of
an image from an imaging device, the imaging device being configured to image a task performed according to a part of the short-term plan, or
a time-series signal from a detector, the detector being configured to detect a signal generated by the task performed according to the part of the short-term plan;
during the first subperiod, acquire a previous lead time in the task performed according to the part of the short-term plan, the previous lead time being calculated by at least one of the image or the time-series signal;
before the second subperiod starts, predict, by using the previous lead time, a future lead time in the task performed according to an other part of the short-term plan in the second subperiod;
revise the short-term plan based on the future lead time;
predict a lead time in the task in the prescribed period by using a lead time in the task performed according to the revised short-term plan; and
generate a new long-term plan in the prescribed period by using the lead time in the predicted prescribed period.

11. A production management system, comprising:
the production management device according to claim 1;
the imaging device; and
the detector.

12. A production management method, comprising:
acquiring a first short-term plan generated based on a first long-term plan, the first long-term plan being of a plan of production in a prescribed period, the first short-term plan being of a plan of production in a first period shorter than the prescribed period, the first period including a first subperiod and a second subperiod after the first subperiod;
during the first subperiod, acquiring at least one of
an image from an imaging device, the imaging device being configured to image a task performed according to a part of the first short-term plan, or a time-series signal from a detector, the detector being configured to detect a signal generated by the task performed according to the part of the first short-term plan;
during the first subperiod, acquiring first progress data of a progress in the task performed according to the part of the first short-term plan, the first progress data being calculated by using at least one of the image or the time-series signal;
before the second subperiod starts, acquiring first prediction data by using the first progress data, the first prediction data being of a prediction of a progress in the task performed according to an other part of the first short-term plan in the second subperiod;
revising the first short-term plan based on the first prediction data;
acquiring second prediction data by using second progress data, the second progress data being of a progress in the task in the first period, the second prediction data being of a prediction of a progress of the production in the prescribed period; and
generating a second long-term plan in the prescribed period by using the second prediction data.

13. A non-transitory computer-readable storage medium storing a program,
the program causing a computer to perform the method according to claim 12.

14. The production management device according to claim 1, wherein the processing circuitry is configured to acquire both of the image and the time-series signal during the first subperiod and calculate the first progress data by using both of the image and the time-series signal.

15. A production management device comprising processing circuitry, the processing circuitry being configured to:
acquire a first short-term plan generated based on a first long-term plan, the first long-term plan being of a plan of production in a prescribed period, the first short-term plan being of a plan of production in a first period shorter than the prescribed period, the first period including a first subperiod and a second subperiod after the first subperiod;
during the first subperiod, acquire at least one of
an image from an imaging device, the imaging device being configured to image a task performed according to a part of the first short-term plan, or
a time-series signal from a detector, the detector being configured to detect a signal generated by the task performed according to the part of the first short-term plan,
during the first subperiod, acquire first progress data of a progress in the task performed according to the part of the first short-term plan, the first progress data being calculated by using at least one of the image or the time-series signal;
before the second subperiod starts, acquire first prediction data by using the first progress data, the first prediction data being of a prediction of a progress in the task performed according to an other part of the first short-term plan in the second subperiod;
revise the first short-term plan based on the first prediction data;
acquire second prediction data by using second progress data, the second progress data being of a progress in the task in the first period, the second prediction data being of a prediction of a progress of the production in the prescribed period;

update master data by using the second prediction data; and generate a second long-term plan in the prescribed period by using scheduling based on the updated master data.

\* \* \* \* \*